July 10, 1934.  I. I. KUZOVENKOFF  1,966,015
NUT AND BOLT LOCK
Filed April 1, 1929
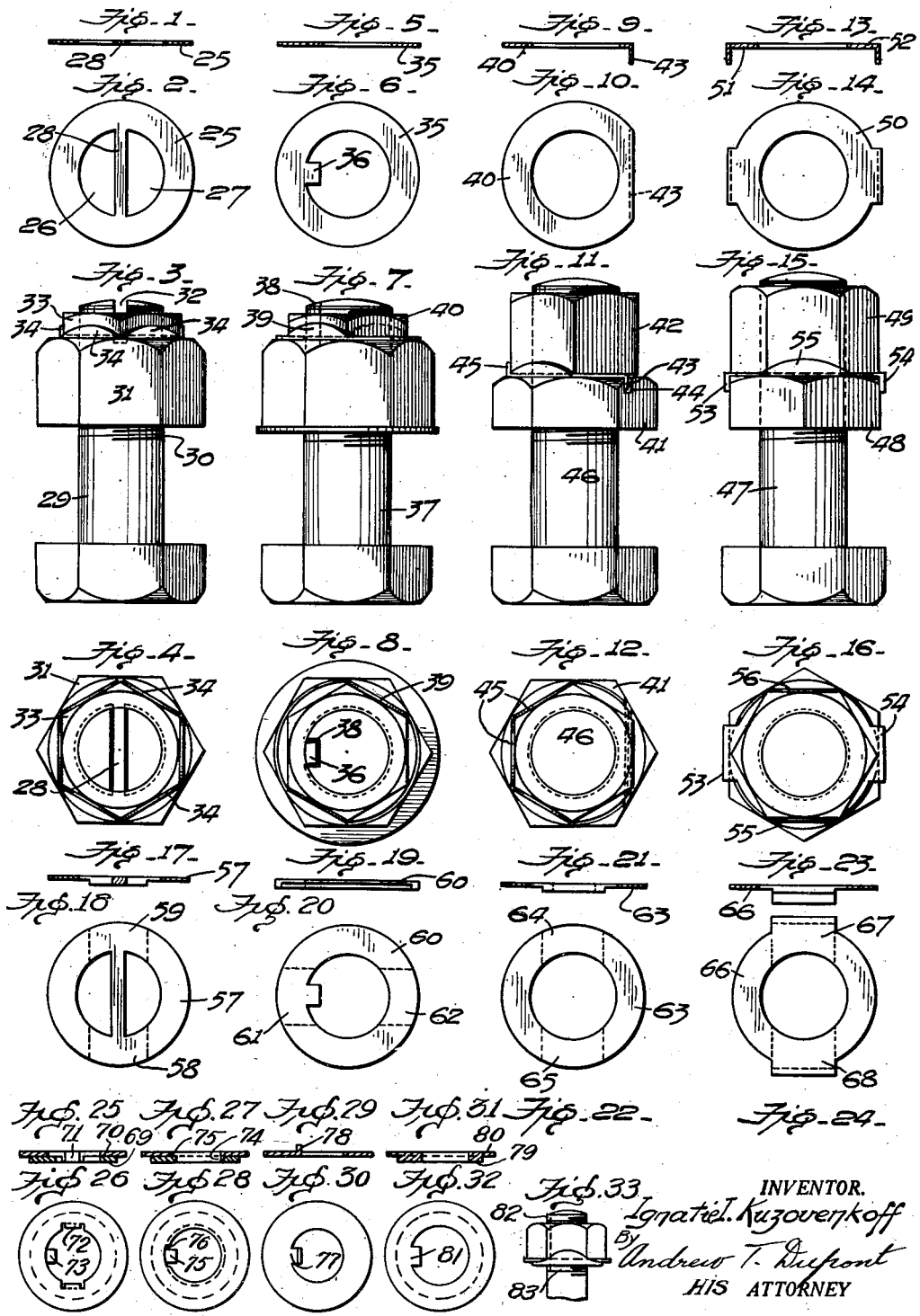
INVENTOR.
Ignatiel. Kuzovenkoff
By Andrew T. Dupont
HIS ATTORNEY Patented July 10, 1934

1,966,015

UNITED STATES PATENT OFFICE 1,966,015

NUT AND BOLT LOCK

Ignatie I. Kuzovenkoff, Washington, D. C.

Application April 1, 1929, Serial No. 351,779

4 Claims. (Cl. 151—15)

My invention relates to an improvement in nut and bolt locks, whose main object is to provide a new and effective locking means whereby the bolt and nut will be rigidly secured against movement and will so remain wherever used and under any circumstances.

Another object of my invention consists in the details of construction and in the combination and arrangement of the several parts of my improved nut lock whereby certain important advantages are attained and the device rendered simpler, less costly to manipulate, and more efficient and advantageous for use, as will be hereinafter more fully set forth.

In the accompanying drawing:

Figure 1 is a horizontal section of the locking washer of my invention;

Figure 2 is a plan view thereof;

Figure 3 is a vertical elevation of a bolt and nut lock embodying my locking washer;

Figure 4 is a plan view looking on top of Figure 3;

Figures 5 to 8 are corresponding views of a modification of my invention;

Figures 9 to 12 are corresponding views of another embodiment of my invention;

Figures 13 to 16 are corresponding views of a further modification of my invention;

Figure 17 is a section of another form of my locking washer;

Figure 18 is a plan view thereof;

Figure 19 is a section of another modification of my locking washer;

Figure 20 is a plan view thereof;

Figure 21 shows another embodiment of my locking washer;

Figure 22 is a plan view thereof;

Figure 23 is a further form of my invention;

Figure 24 is a plan view thereof;

Figures 25 and 26 are, respectively, a sectional elevation and a plan view of a preferred form of my invention;

Figures 27 and 28 are, respectively, a sectional elevation and a plan view of another preferred form of my invention;

Figures 29 and 30 are, respectively, a sectional elevation and a plan view of a further preferred form of my invention;

Figures 31 and 32 are, respectively, a sectional elevation and a plan view of a still further preferred form of my invention; and, Figure 33 is a fragmentary elevation of still another preferred embodiment of my invention.

Referring particularly to Figures 1 to 4 of the drawing, my improved locking means is in the nature of a ring 25, in which circular portions are cut off at 26 and 27 so as to provide a central tongue 28 along a diameter of the ring. The locking ring 25 may be produced from any suitable metal by a stamping operation, or by any other method, and is relatively thin so as to be readily flexible and capable of being easily bent.

In Figure 3, I have shown a bolt and nut assembly wherein the locking ring 25 is used to ensure tightness. In this figure, numeral 29 represents a bolt having the usual threaded portion 30, upon which rides the nut 31. Into the end of the threaded portion 30 is cut a diametrical groove 32 of substantial depth and of a width slightly greater than that of the tongue 28 of locking ring 25.

In the practice of my invention, nut 31 is driven home along the threaded shank 30; the locking ring 25 is then slipped over the end of the bolt in such manner that the tongue 28 will slide into the groove 32 of the bolt 29, until the ring comes to rest on top of the nut 31. A lock nut 33, of smaller outward dimensions than nut 31, is then screwed on threaded shank 30 until it wedges tightly against the locking ring 25. In order to prevent loosening of the lock nut 33, the edges of the locking ring 25 are bent upward, as at 34, along each of the vertical faces of nut 33.

It will be evident that by this means the lock nut 33 is made virtually integral with the bolt shank 29, since it can not have any rotary motion with respect thereto.

It follows, therefore, that any loosening of the nut 31 is also prevented.

It will be noted that since lock nut 33 has its outward dimensions smaller than those of nut 31, ample protection against destruction will be assured for the locking ring 25 since, in its position wherein its edges are bent, it conforms to the periphery of nut 33.

In Figures 5 to 8, the locking ring 35 is provided with an inwardly projecting tongue 36, which extends only partly across the inner diameter of the ring. In this instance, the bolt 37 has a lateral groove 38 cut in the end of the threaded portion thereof and slightly wider than the tongue 36.

The assembly of the parts, shown in Figure 7, is similar to that of Figure 3, with the tongue 36 and groove 38 cooperating, as heretofore explained, and the edges of ring 35 being bent up, as shown at 39, against one or more of the vertical faces of the lock nut 40.

In Figures 9 to 12, the locking ring 40 is truly cylindrical in appearance inasmuch as no tongue is made integral therewith.

Figure 11 discloses the assembly of the parts, with the locking ring 40 between the nut 41 and the lock nut 42 having one edge 43 bent down and engaging a notch 44 cut downwardly upon the upper face of the nut 41, while other edges 45 of the ring are bent upwardly against the vertical faces of the lock nut 42.

In this embodiment of my invention, it will be noted that no notches or grooves are cut upon bolt 46, which thus remains wholly intact.

In Figures 13 to 16, I have shown a modification of my invention wherein neither the bolt 47 nor any of the nuts 48 and 49 are indented in any way. For this purpose, the locking ring 50 is provided with outward extensions 51, 52, along a diameter thereof. When the ring is in place between nuts 48 and 49, the extensions 51 and 52 are bent down at 53, 54, along the vertical faces of nut 48, while the remaining edges of the ring are bent upwardly along the vertical faces of nut 49, as at 55, 56.

In Figures 17 and 18, I have shown a locking ring 57 similar to that disclosed in Figures 1 and 2, except that the ring 57 is provided with thickened portions 58 and 59 to make it stronger and, hence, increase its usefulness.

In Figures 19 and 20, the ring 60 is also similar to ring 35, and is provided with the thick portions 61, 62.

In Figures 21 and 22, the ring 63 is identical to ring 40, but for the provision of thick portions 64, 65.

In Figures 23 and 24, the locking ring 66 is similar to ring 50, but is provided with the thickened parts 67, 68.

It will be understood that the assemblies in which the embodiments shown in Figures 17 to 24 are used will be in all particulars similar to those illustrated in Figures 3, 7, 11 and 15, respectively, the only difference being that a thicker portion of the locking ring will be subjected to the pressure resulting from screwing the lock nut in place upon the ring.

In Figures 25 and 26, I have shown an embodiment of my locking disc which also has a thick portion 69 and a thin portion 70 which are formed of separate discs united by means of folds 71 on the thinner disc fitting in grooves 72 cut in the thicker disc. In this manner, no rotary movement is permitted between the disc portions, and the locking disc as a whole may be slid by means of the tongue 73, projecting from the thicker disc, in the longitudinal groove, as in Figures 5 to 8.

It is evident that portions 69 and 70 may be made of different and suitable metals and that either one may be easily replaced when worn out.

Figures 27 and 28 show a modification substantially similar to Figures 25 and 26, with the exception that the fold 74 of the upper thin disc extends circularly and downwardly within the opening of the thicker disc and the tongue 75 projecting from the thicker disc extends through a cut 76 in the fold, thus ensuring a rigid assembly of the parts.

Figures 29 and 30 show an embodiment of my invention wherein the thicker disc portion shown in Figures 25 to 28 has its tongue 77 provided with a vertically rising extension or fold 78.

Figures 31 and 32 show the principal construction of my locking disc, which is made of a single piece having a thicker portion 79 and a thin flexible foldable portion 80, it being readily apparent that the portion of greater thickness affords a reinforcing means for the tongue 81.

Figure 33 shows a nut and bolt assembly wherein the lateral groove 82 is cut off along the threaded portion 83 of the bolt and the locking discs disclosed in Figures 31 and 32 are used.

It will be understood that the thin flexible portion of the disc disclosed in Figures 25 to 33 is bent up against the side of the nut after the nut is driven home on the bolt, in the same manner as is shown in Figures 3, 7, 11 and 15, supra.

What I claim is:—

1. A nut and bolt locking device, comprising a bolt, a threaded portion thereon, said threaded portion having a lateral groove, two nuts on said threaded portion, one of said nuts being of substantially smaller dimension than the other, a disc on said threaded portion between said nuts, said disc having an inside tongue, said tongue being adapted to be slid within the aforementioned lateral groove, and said disc having peripheral circular flexible portions projecting in the form of segments from under the base of the nut having the smaller dimension so that these portions may be bent against the sides of the last mentioned nut and the disc will be wholly within the confines of the larger nut.

2. A nut and bolt locking device, comprising a bolt, a threaded portion thereon, said threaded portion having a lateral groove, a nut on said threaded portion, an annular disc on said threaded portion under said nut, said disc having an inside tongue, said tongue being adapted to be slid within the aforementioned lateral groove, and said disc having integral peripheral portions projecting in the form of segments from under the base of the aforementioned nut so that these portions may be bent against the side of this nut.

3. A nut and bolt locking device as set forth in claim 1, wherein the locking disc has a portion of greater thickness at the points of greatest stress in the disc.

4. A nut and bolt locking device as set forth in claim 2, wherein the locking disc has a portion of greater thickness at the points of greatest stress in the disc.

IGNATIE I. KUZOVENKOFF.